United States Patent Office 3,452,833
Patented July 1, 1969

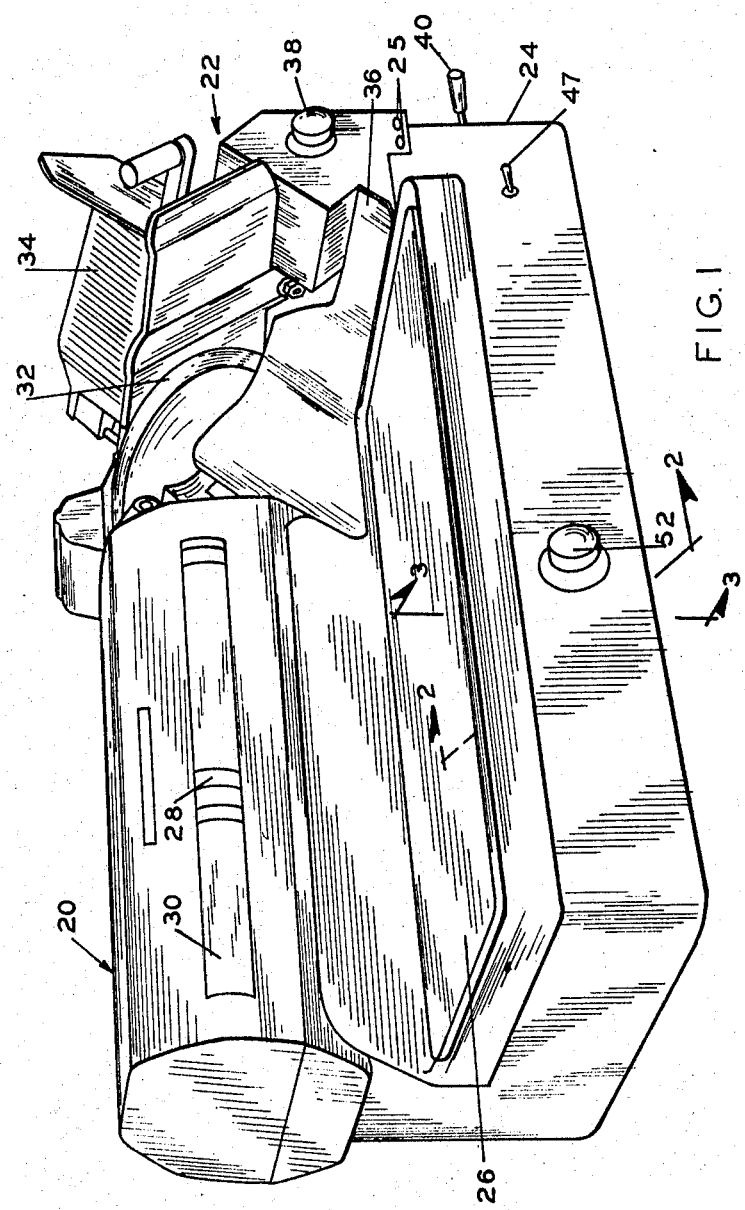

3,452,833
WEIGHING AND SLICING APPARATUS
Clemens Anton Wolters, 337 Cliffview Drive,
Columbus, Ohio 43202
Filed Oct. 21, 1965, Ser. No. 504,284
Int. Cl. G01g 23/14
U.S. Cl. 177—164          4 Claims

ABSTRACT OF THE DISCLOSURE

A food slicing and weighing apparatus for automatically terminating the slicing portion of the operation when a predetermined weight of food has been sliced. The apparatus is further characterized by an electric motor for powering a slicer and novel electrical control means and linkage for automatically de-energizing said motor when said predetermined weight has been sliced. The control means includes a first electrical contact attached beneath the weigh platform and a second contact on a vertical threaded shaft which is adjustable to a preset spacing beneath the first contact proportional to weight of sliced material desired.

---

The present invention relates generally to weighing and slicing apparatus and particularly to a novel combined food weighing and slicing apparatus.

In general the combined weighing and slicing apparatus of the present invention comprises a weighing means, a slicing means disposed such that sliced food falls upon the weighing means, and switch means automatically actuated to turn off the slicing means when a predetermined amount of food has been sliced and deposited on the weighing means.

In the retail food industry specifically small grocery stores, and the like, a great deal of bulk luncheon meats and cheese are sold over the counter which are sliced and weighed according to customer order.

The employee must by trial and error slice the food and then weigh the same. This usually results in many trips back and forth between the slicing means and the weighing scale before the proper amount of food is sliced. Of course a great deal of time is lost in which the employee could be performing other sales services for the customer.

In accordance with the present invention the novel weighing and slicing apparatus permits an accurate amount of food to be sliced with only one weighing necessary.

As another aspect of the present invention, sliced food falls directly onto the weighing means and therefore may be weighed immediately.

As another aspect of the present invention, the slicing means may be set to slice a predetermined amount of food and then shuts off automatically without being attended by the user.

It is therefore an object of the present invention to provide an apparatus of the type described which permits food to be sliced and weighed in one operation thereby eliminating the necessity of moving back and forth from a slicer to a weighing scale.

It is another object of the present invention to provide an apparatus of the type described which permits more efficient customer service.

It is another object of the present invention to provide an apparatus of the type described which is simple to operate and permits a predetermined amount of food to be sliced automatically.

Further objects and advantages of the present invention will be apparent from the following description, reference being had to the accompanying drawings where-in a preferred form of embodiment of the invention is clearly shown.

Figure 3:
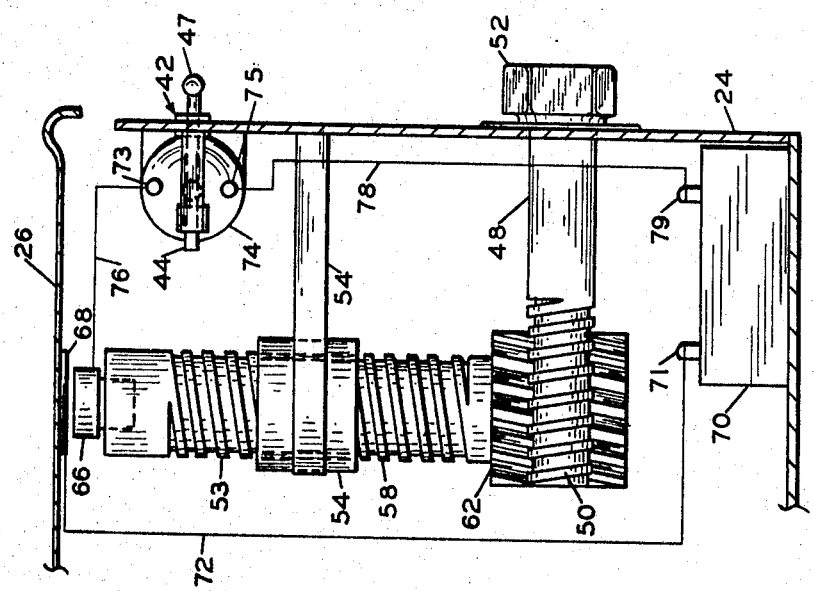
Figure 2:
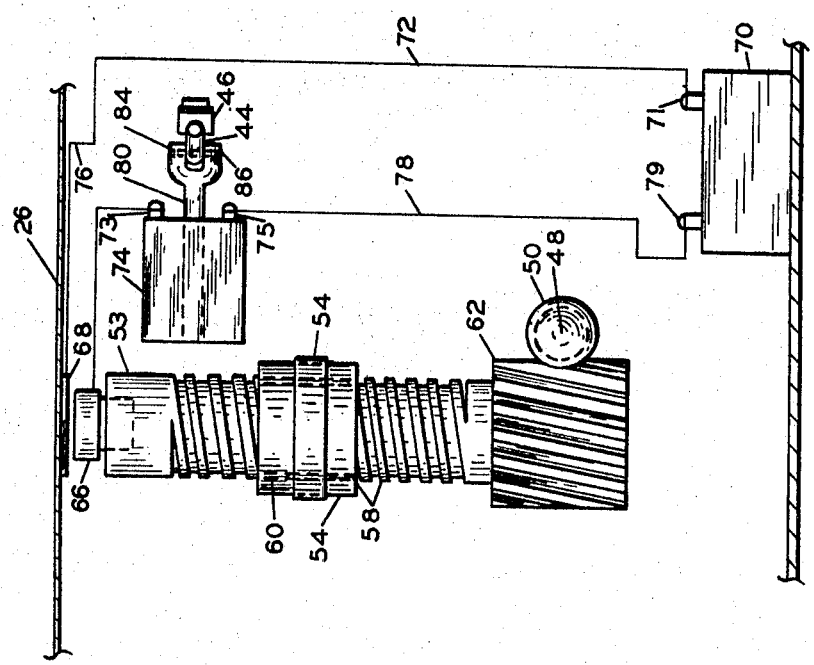
Figure 4:
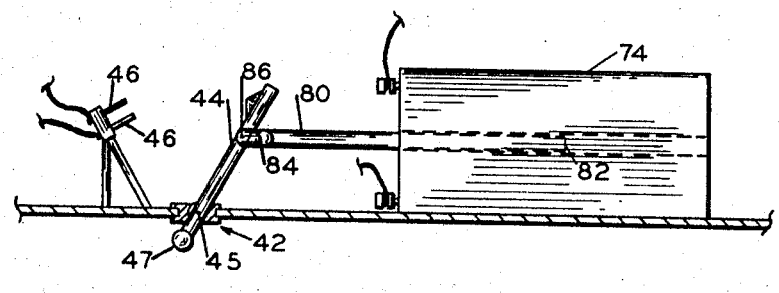
Figure 5:
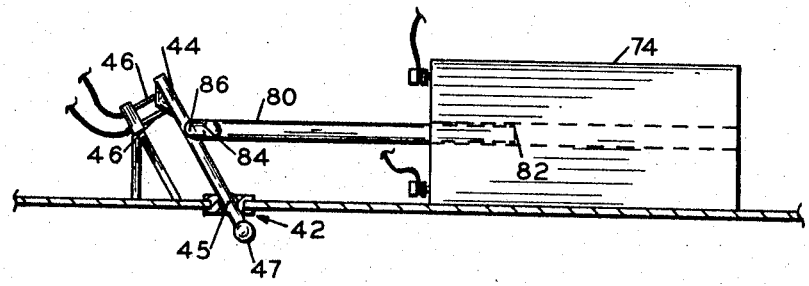

In the drawings:
FIG. 1 is a perspective view of a combined weighing and slicing apparatus constructed in accordance with the present invention;
FIG. 2 is a partial side sectional view of a portion of the apparatus shown in FIG. 1 illustrating the novel quantity selector slicer switch means and associated electrical activating means;
FIG. 3 is a rear sectional view of that portion of the apparatus of FIG. 1 shown in FIG. 2;
FIG. 4 is a partial top view of a portion of switch means shown in FIG. 2 illustrating the electromagnetically activated linkage and slicer switch means in an off or open position; and
FIG. 5 is a view similar to the view shown in FIG. 4 but illustrates the electromagnetically actuated linkage and slicer switch means in an on or closed position.

Referring in detail to the drawings a combination weighing and slicing apparatus constructed in accordance with the present invention is illustrated in FIG. 1 and includes a weighing scale, indicated generally at 20, and a slicing means, indicated generally at 22.

The major portion of weighing scale 20 may be conventionally constructed and operates in a conventional manner forming no part of the present invention and therefore will not be described in detail herein.

Slicing means 22 is conventionally constructed and is preferably automatic and electrically powered. Slicing means 22 is simply mounted on the housing or base 24 of scale 20 by conventional means such as for example screws 25 which are spaced along the lower edge of slicing means 22.

Scale 20 includes a weighing platform 26, preferably spring balanced and vertically deflectable from a normal unloaded position proportional to the amount of weight deposited upon platform 26. Platform 26 is operatively connected in the conventional manner to a indicating means 28 which moves along a series of calibrated figures, noted shown, in a window 30 in the conventional manner.

Slicing means 20, in general, preferably includes a knife edge 32 and a food loading platform 34 which form a slicing station which is disposed adjacent and above weighing platform 26. A guide chute 36 directs the sliced food so that it falls upon weighing platform 26 as it is sliced.

It is important to point out that many styles of conventionally constructed scales and slicing means made by present manufactures could by combined and used without departing from the spirit of the present invention.

Slicing means 20 is connected to a source of electrical power, such as an electrical wall outlet, not shown.

Various controls may be optionally included in the type of slicing means used such as a slice thickness controller 38, or a loading platform speed controller 40 without departing from the spirit of the present invention.

Now referring to FIGS. 4 and 5, a master switch means indicated generally at 42, FIG. 4, includes a lever bar 44 pivotaly mounted as at 45 through housing 24 between an open position, as seen in FIG. 4, and a closed position as seen in FIG. 5.

Lever bar 44 includes a handle portion 47 and is manually pivoted to a closed position engaging contacts 46 which closes an electric circuit to a motor, not shown, which drives food loading platform back and forth relative to rotating knife edge 32 which is driven by another motor not shown, which is connected to the same electrical circuit as the above mentioned platform motor.

Lever bar 44 is automatically pivoted to the open position seen in FIG. 4 by the novel combination of a quantity selector and associated actuating means seen in FIGS.

2 and 3. When lever bar 44 is in the open position both motors and hence slicing means 22 are inoperative.

Now referring specifically to FIGS. 2 and 3, a shaft 48 is rotataby mounted through housing 24 and includes an inner end provided with a worm thread 50 and an outer end provided with a fixed manually actuated quantity sector knob 52 for manual rotation of shaft 48.

A vertically disposed shaft 53 is extended through a collar 54 which is fastened to a bracket 56 which in turn is fastened to housing 24.

Shaft 53 is provided with a threaded portion 58 which mates with a threaded portion 60 on the inner wall of collar 54.

The lower end of shaft 53 is rigidly fastened to a gear 62 which mates with worm thread 50 of shaft 48.

An electrical contact 66 is rigidly fastened to the top of shaft 53. As shaft 48 and hence worm thread 50 are rotated by manual rotation of knob 52, gear 62 and shaft 53 rotate and travel vertically through the action of threads 58 and 60. It is understood that the maximum distance of vertical travel depends upon the height of gear 62 and the length of threaded portion 58. As long as there is rotating worm thread 50, shaft 53 may travel in a sufficient contact between vertically moving gear 62 and rotating worm thread 50, shaft 53 may travel in a vertical manner the length of threaded portion 58.

Another electrical contact 68 is fastened to the bottom surface of weighing platform 26 and is aligned to engage contact 66 on the top of shaft 53.

Contacts 68 and 66 are arranged so that the distance between them is proportional to the deflection of platform 26 responsive to the weight of material on platform 26. The thread and gearing arrangement described above is made to correspond accordingly and a calibrated scale, not shown, is provided on quantity selector knob 52 to translate the rotational displacement of shaft 48 into a weight reading corresponding to the reading indicated on weighing scale 30 for a given downward displacement of platform 26.

Still referring to FIGS. 2 and 3, contact 68 is connected to one pole 71 of a source of direct current 70, in the form of a transformer, by lead wire 72. Contact 66 is connected to one pole 73 of an electromagnet 74 by lead wire 76 and lead wire 78 connects the other pole 75 of electromagnet 74 to the other pole 79 of transformer 70.

In view of the above description, it will be understood that when contact 66 engages contact 68, electromagnet 74 will be energized.

Referring again to FIGS. 4 and 5, a rod 80 made of a magnetic susceptable material, an iron for example, has one end 82 freely disposed between the magnetic field of electromagnet 74 and the other forkshaped end 84 pivotally connected to level bar 44 at pivot pin 86.

In operation, the user first places the food to be sliced on slicer loading platform 34 and then turns quantity selector knob 52 to the desired setting. The rotation of knob 52 rotates shaft 48 which in turn raises or lowers shaft 53 by means of gear 62 and screw threads 58 and 60 as previously described. The contact 66 on the top of shaft 53 is then moved the desired distance away from contact 68. This distance is the same distance platform 26 will descend when a quantity of food equal to the scale reading at which knob 52 is set is deposited on platform 24.

The user pivots lever bar 44 manually from the open or off position of FIG. 4 to the closed or on position seen in FIG. 5 to start operation of slicing means 20. Then he is free to perform other services for the customer or customers while the food is being sliced.

As food is sliced by knife means 32 it falls upon weighing platform 26. When the pre-selected quantity of food determined by the setting of knob 52, has been sliced and has fallen on platform 26 the slicer automatically is turned off as the platform 26 will have descended far enough so that contact 68 engages contact 66. This closes the previously described circuit and energizes electromagnet 74.

When electromagnet 80 is energized actuating rod 74 is pulled inwardly and pivots lever bar 44 from the closed position of FIG. 5 to the open position of FIG. 4. The electric circuit to the motors, not shown, which drive slicing means 22 is thereby opened and the slicing operation is stopped when the desired quantity of food has been sliced.

It is important to point out that the preciseness of control depends mainly upon the calibrations on selector knob 52 and the gear ratio between worm threads 50, gear 64 and threads 58 and 60. For practical purposes, accuracy of plus or minus two ounces is sufficient.

It is also important to point out that the automatic electromagnetic switch actuating means and quantity selecor knob 52 could be eliminated and yet a combined weighing scale and slicer which required constant manual attention would still be a great improvement over separate devices. In such a completely manual device, lever bar 44 could be manually pivoted to the open position by the user when the weight indicator reaches the desired reading.

Although such a manually operated apparatus woud be less accurate and less convenient as well as not being as time saving, it still would eliminate the numerous trial and error weighings required with separate devices presently in use.

While the form of embodiment of the present invention as herein disclosed constitutes a preferred form, it is to be understood that other forms might be adopted.

I claim:

1. A weighing and slicing apparatus comprising, in combination, frame means, a weighing scale including a weighing platform vertically deflectable from a normal position proportional to the amount of material disposed thereon and weight indicating means operatively connected to said platform; electrically powered slicing means connected to said weighting scale and including a knife means and a slicing station disposed adjacent and above said weighting platform such that material sliced by said knife means falls upon said platform; circuit means including a power source, switch means connected to said power source controlling said electrically powered slicing means, means for operating said switch means, a first contact attached beneath and moved by vertical deflection of said platform, a second contact adapted to be engaged by said first contact, actuator means for adjusting the normal spacing of said contacts, said actuator comprising a guide including a vertical threaded bore; a vertical threaded shaft disposed in the bore, said vertical shaft having said second contact on its upper end and including a first gear portion on its lower end, a horizontal shaft rotatably mounted on said frame means and including an inner end provided with a second gear portion in driving engagement with said first gear portion, and an outer end provided with a quantity selector knob whereby said actuator means is calibrated proportional to said weight indicating means so the contact spacing is indicative of the weight of the sliced material desired, said contacts being connected to said switch operating means and said power source whereby closing of said contacts in response to the downward movement of said platform will complete a circuit and cause said switch operating means to be energized to thereby move said switch means to de-energize the slicing apparatus.

2. The apparatus of claim 1 wherein said first and second gear portions comprise a worm gear assembly to rotatably connect said horizontal and vertical shafts due to movement of said quantity selector knob.

3. The apparatus of claim 1 wherein said switch means is movable between an on and off position for selectively energizing and de-energizing said electrically powered slicing means and and said switch operating means comprises an electromagnet including an armature and means connecting said armature to said switch means for movement therewith.

4. The apparatus of claim 3 wherein said electromagnet connecting means includes a rocker arm pivotably attached to said switch means and armature whereby said switch means may be maintained in said on position when said electromagnet is closed and said switch means is opened by said pivotally mounted rocker arm when said electromagnet is energized and retracts its armature.

References Cited
UNITED STATES PATENTS
2,165,047  7/1939  Gualdoni _____ 146—102.4

RICHARD B. WILKINSON, *Primary Examiner.*
L. H. HAMBLEN, *Assistant Examiner.*

U.S. Cl. X.R.
146—102; 177—245